United States Patent
Hoshino et al.

(10) Patent No.: US 10,329,739 B2
(45) Date of Patent: Jun. 25, 2019

(54) CONSTRUCTION MACHINE

(71) Applicant: HITACHI CONSTRUCTION MACHINERY CO., LTD., Tokyo (JP)

(72) Inventors: Masatoshi Hoshino, Tsuchiura (JP); Yasutaka Tsuruga, Ryuugasaki (JP); Kiwamu Takahashi, Moriyama (JP); Seiji Hijikata, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 101 days.

(21) Appl. No.: 15/555,685

(22) PCT Filed: Mar. 11, 2016

(86) PCT No.: PCT/JP2016/057877
§ 371 (c)(1),
(2) Date: Sep. 5, 2017

(87) PCT Pub. No.: WO2017/154220
PCT Pub. Date: Sep. 14, 2017

(65) Prior Publication Data
US 2018/0106018 A1 Apr. 19, 2018

(51) Int. Cl.
*F16D 31/02* (2006.01)
*E02F 9/22* (2006.01)
(Continued)

(52) U.S. Cl.
CPC .......... *E02F 9/2235* (2013.01); *E02F 9/2225* (2013.01); *E02F 9/2246* (2013.01);
(Continued)

(58) Field of Classification Search
CPC .......... F15B 11/166; F15B 2211/20553; F04B 49/002; F16H 61/468; F16H 61/475; F16H 61/478
(Continued)

(56) References Cited

U.S. PATENT DOCUMENTS 3,884,039 A * 5/1975 Pourian ................. F04B 49/002
60/447
3,986,358 A * 10/1976 Hoffmann ............... F16H 61/46
60/444

(Continued)

FOREIGN PATENT DOCUMENTS

JP 05-125747 A 5/1993
JP 05-248401 A 9/1993

(Continued)

OTHER PUBLICATIONS

International Preliminary Report on Patentability received in corresponding International Application No. PCT/JP2016/057877 dated Sep. 20, 2018.

(Continued)

*Primary Examiner* — Michael Leslie
(74) *Attorney, Agent, or Firm* — Mattingly & Malur, PC

(57) ABSTRACT

The invention provides a construction machine in which the load torque at the time of engine start-up can be reduced even when the engine stops against the will of the operator. A hydraulic excavator includes a control device (35) having a pump displacement control section (37) and an unload control section (38). The pump displacement control section (37) makes the displacement of a hydraulic pump (16) variable to a minimum displacement by controlling a regulator device (20) when the speed of an engine (14) detected by a speed sensor (41) becomes equal to or less than a preset low speed N3 at the time of driving of the engine (14). The unload control section (40) controls an unloading valve (24) to the open position at the time of start-up of the engine (14).

4 Claims, 6 Drawing Sheets

(51) Int. Cl.
*F16H 61/475* (2010.01)
*F15B 11/16* (2006.01)
*F15B 11/00* (2006.01)
*F15B 11/10* (2006.01)
*E02F 3/32* (2006.01)

(52) U.S. Cl.
CPC .......... *E02F 9/2285* (2013.01); *E02F 9/2292* (2013.01); *E02F 9/2296* (2013.01); *F15B 11/00* (2013.01); *F15B 11/10* (2013.01); *F15B 11/166* (2013.01); *F16H 61/475* (2013.01); *E02F 3/32* (2013.01); *F15B 2211/20553* (2013.01); *F15B 2211/30* (2013.01); *F15B 2211/633* (2013.01); *F15B 2211/6336* (2013.01); *F15B 2211/6652* (2013.01); *F15B 2211/7053* (2013.01)

(58) Field of Classification Search
USPC .......................................... 60/444, 447, 449
See application file for complete search history.

(56) References Cited

U.S. PATENT DOCUMENTS 5,267,441 A    12/1993   Devier et al.
7,020,553 B2 *   3/2006   Nakamura ............ F04B 49/002
                                                                                                 60/431

FOREIGN PATENT DOCUMENTS

JP      2008-151211 A      7/2008
JP      2015-055350 A      3/2015

OTHER PUBLICATIONS

International Search Report of PCT/JP2016/057877 dated Jun. 14, 2016.

* cited by examiner

CONSTRUCTION MACHINE

TECHNICAL FIELD

The present invention relates to construction machines such as hydraulic excavators and the like.

BACKGROUND ART

A construction machine such as a hydraulic excavator includes an engine; a hydraulic pump of a variable displacement type driven by the engine; a hydraulic actuator; and a directional control valve for controlling the flow of hydraulic fluid from the hydraulic pump to the hydraulic actuator based on an operation of an operating member. The construction machine also includes a pilot pump of a fixed displacement type driven by the engine and a regulator device configured to make the displacement of the hydraulic pump variable with using the delivery pressure of the pilot pump.

Thus far, the technique of reducing the load torque necessary for engine start-up has been proposed for the purpose of enhancing the start-up performance of the engine, for example, in a low-temperature environment. In Patent Document 1, the load on the hydraulic pump is reduced by reducing its displacement to a minimum displacement at the time of engine start-up.

While, in Patent Document 2, an unloading valve is provided on the line connecting the delivery side of the pilot pump to a tank, and the load on the pilot pump is reduced by operating the unloading valve to the open position at the time of engine start-up.

PRIOR ART DOCUMENT

Patent Document

Patent Document 1: JP-2008-151211-A
Patent Document 2: JP-1993-125747-A

SUMMARY OF THE INVENTION

Problem to be Solved by the Invention

The load torque of the engine can be reduced further by reducing the load on the pilot pump as well as the load on the hydraulic pump at the time of engine start-up. That is, it can be contemplated that not only the displacement of the hydraulic pump is reduced to the minimum displacement at the time of engine start-up, but the unloading valve is also operated in the open position. However, if the unloading valve is operated in the open position at the time of engine start-up, a sufficient delivery pressure cannot be obtained from the pilot pump, and the regulator device cannot be driven. In other words, the displacement of the hydraulic pump cannot be made variable at the time of engine start-up.

Thus, as described in Patent Document 1, it can be contemplated that the displacement of the hydraulic pump is made variable to the minimum displacement before stopping the engine. More specifically, when a control device determines based on, for example, a signal from the key switch that the key switch has been operated to the OFF position, the control device makes the displacement of the hydraulic pump variable to the minimum displacement before stopping the engine. In that case, however, if the engine stops due to overload or the like with the key switch being in the ON position, the displacement of the hydraulic pump cannot be made variable. This means that the load torque at the time of engine start-up may be increased.

An object of the invention is to provide a construction machine in which the load torque at the time of engine start-up can be reduced even when the engine stops against the will of the operator.

Means for Solving the Problem

To achieve the above object, a construction machine according to the invention includes: an engine; a speed sensor for detecting the speed of the engine; a hydraulic pump of a variable displacement type driven by the engine; a hydraulic actuator; a directional control valve for controlling the flow of hydraulic fluid from the hydraulic pump to the hydraulic actuator based on an operation of an operating member; a pilot pump of a fixed displacement type driven by the engine; a regulator device configured to make the displacement of the hydraulic pump variable with using the delivery pressure of the pilot pump; an unloading valve provided on a line connecting the delivery side of the pilot pump to a tank, the unloading valve being switchable between an open position and a closed position; and a control device including a pump displacement control section configured to control the displacement of the hydraulic pump by controlling the regulator device and an unload control section configured to control the unloading valve to the open position at the time of start-up of the engine. The pump displacement control section is configured to: store a low speed preset for the engine, the low speed being smaller than a minimally required idle speed of the engine necessary to obtain the delivery pressure of the hydraulic pump capable of driving the hydraulic actuator and larger than a minimally required cranking speed of the engine necessary to obtain the delivery pressure of the pilot pump capable of driving the regulator device; and make the displacement of the hydraulic pump variable to a minimum displacement by controlling the regulator device when the speed of the engine detected by the speed sensor becomes equal to or less than the low speed while the engine is being driven.

Effect of the Invention

In accordance with the invention, the displacement of the hydraulic pump can be made variable to a minimum displacement before the engine stops even when the engine stops against the will of the operator (that is, when the speed of the engine detected by the speed sensor becomes equal to or less than the low speed). Thus, at the time of engine start-up, the load on the hydraulic pump can be reduced. Also, the load the pilot pump can be reduced without any trouble being caused even when the unloading valve is operated to the open position at the time of engine start-up. Therefore, even when the engine stops against the will of the operator, the load torque at the time of engine start-up can be reduced.

MODES FOR CARRYING OUT THE INVENTION

An embodiment of the present invention will now be described with reference to the accompanying drawings.

Figure 1:
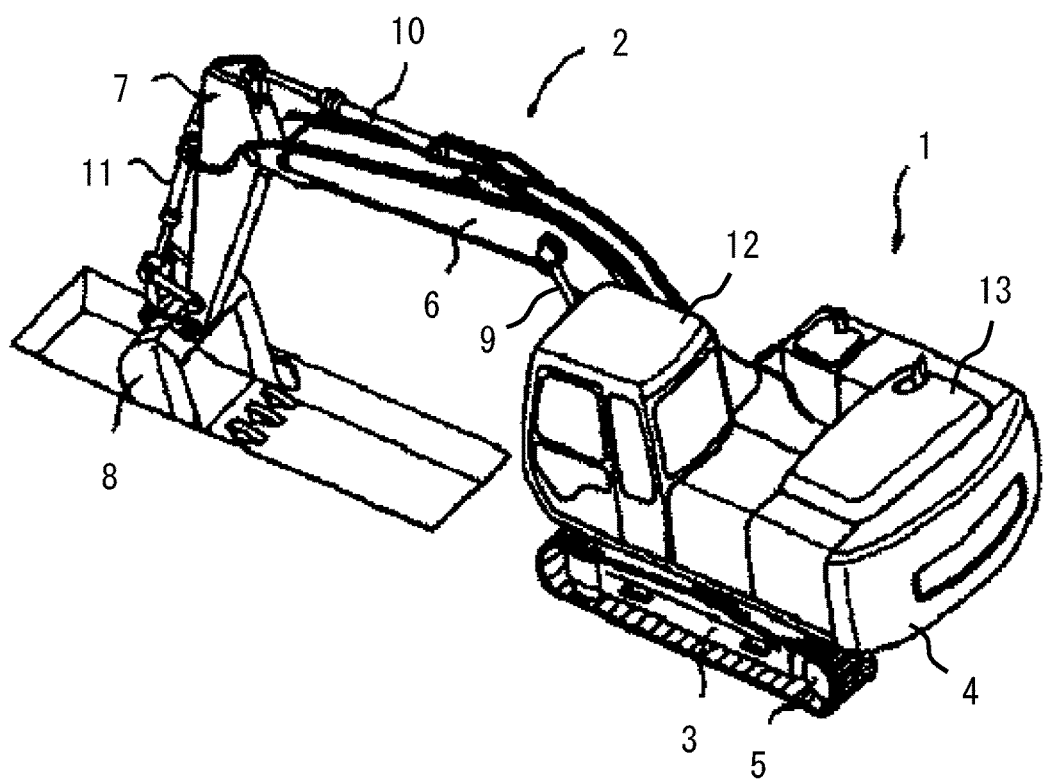
FIG. 1 is a perspective view illustrating the structure of a hydraulic excavator according to an embodiment of the invention.

FIG. 1 is a perspective view illustrating the structure of a hydraulic excavator according to the embodiment of the invention.

The hydraulic excavator includes a machine body 1 and a front work device 2. The machine body 1 includes a crawler-type lower travel structure 3 and an upper swing structure 4 provided swingably atop the lower travel structure 3. The lower travel structure 3 travels by rotational driving of left and right travel motors 5 (only the left travel motor 5 is illustrated in FIG. 1). The upper swing structure 4 swings by rotational driving of a swing motor (not illustrated).

The front work device 2 includes a boom 6 connected to the front of the upper swing structure 4 in a vertically pivotable manner; an arm 7 connected to the boom 6 in a vertically pivotable manner; and a bucket 8 connected to the arm 7 in a vertically pivotable manner. The boom 6, the arm 7, and the bucket 8 pivot by expansion and contraction driving of a boom cylinder 9, an arm cylinder 10, and a bucket cylinder 11, respectively.

A cab 12 is provided at the front of the upper swing structure 4 while a machine room 13 is provided at the back of the upper swing structure 4. Installed within the machine room 13 are an engine 14 (see FIG. 2 described later) and other devices.

Provided inside the cab 12 are a seat (not illustrated) on which the operator sits and left and right travel-related operating members (specifically, which are not illustrated, but each is integrated one including a control pedal and a control lever). The operator operates the left travel-related operating member in the front-back direction for instructing an operation of the left travel motor 5, and operates the right travel-related operating member in the front-back direction for instructing an operation of the right travel motor 5.

Figure 2:
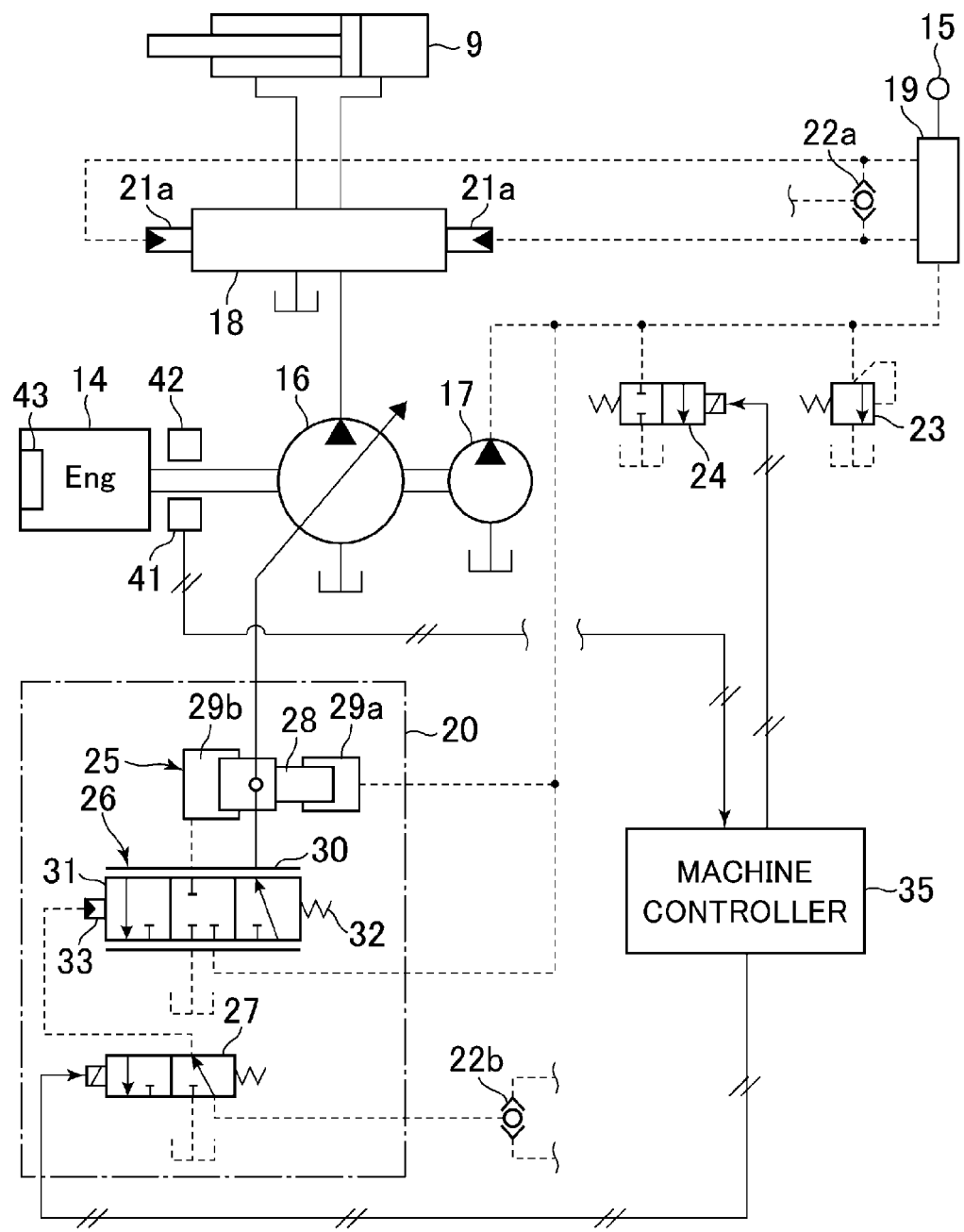
FIG. 2 is a circuit diagram illustrating a hydraulic drive system of the hydraulic excavator according to the embodiment of the invention together with a machine controller.

Also provided inside the cab 12 are a left work-related operating member (specifically, which is not illustrated, but is a control lever) and a right work-related operating member 15 (specifically, which is a control lever as illustrated in FIG. 2 described later). The operator operates the left work-related operating member in the front-back direction for instructing an operation of the arm cylinder 10, and operates the left work-related operating member in the left-right direction for instructing an operation of the swing motor. Also, the operator operates the right work-related operating member 15 in the front-back direction for instructing an operation of the boom cylinder 9, and operates the right work-related operating member 15 in the left-right direction for instructing an operation of the bucket cylinder 11.

Now, described is a hydraulic drive system of the hydraulic excavator of the present embodiment. FIG. 2 is a circuit diagram illustrating the hydraulic drive system of the hydraulic excavator of the present embodiment together with a machine controller. Note that among a plurality of the hydraulic actuators described above, FIG. 2 representatively illustrates a directional control valve and an operation device which are concerned with driving the boom cylinder 9. Because the directional control valves and operation devices which are concerned with driving the other hydraulic actuators (the left and right travel motors 5, the swing motor, the arm cylinder 10, and the bucket cylinder 11) work in the same fashion, description thereof are omitted.

The hydraulic drive system includes the engine 14; a hydraulic pump 16 of a variable displacement type and a pilot pump 17 of a fixed displacement type, both being driven by the engine 14; a boom directional control valve 18 for controlling the flow of the hydraulic fluid from the hydraulic pump 16 to the boom cylinder 9; an operation device 19 for switching the boom directional control valve 18 based on the operation of the work-related operating member 15 in the front-back direction; and a regulator device 20 for making the displacement of the hydraulic pump 16 variable. It should be noted that the rotary shaft of the engine 14, the rotary shaft of the hydraulic pump 16, and the rotary shaft of the pilot pump 17 are connected together at all times.

The operation device 19 includes a pilot valve for generating a pilot pressure by reducing the delivery pressure of the pilot pump 17 based on the operation of the operating member 15 in the front-back direction. When the operating member 15 is operated in front side from its neutral position, the pilot pressure corresponding to the operation amount of the operating member 15 in the front side is generated. The pilot pressure generated is output to a pressure receiver 21a of the boom directional control valve 18 to switch the boom directional control valve 18. This allows the hydraulic fluid to be supplied from the hydraulic pump 16 to the rod side of the boom cylinder 9, thereby contracting the boom cylinder 9.

When the operating member 15 is operated in back side from the neutral position, the pilot pressure corresponding to the back side operation amount of the operating member 15 is generated. The pilot pressure generated is output to a pressure receiver 21b of the boom directional control valve 18 to switch the boom directional control valve 18. This allows the hydraulic fluid to be supplied from the hydraulic pump 16 to the bottom side of the boom cylinder 9, thereby expanding the boom cylinder 9.

The operation device 19 has a shuttle valve 22a provided on its output side. The shuttle valve 22a receives the pilot pressures output from the operation device 19 toward the pressure receivers 21a and 21b of the boom directional control valve 18 and outputs the higher pilot pressure. Likewise, each of the other operation devices not illustrated also has a shuttle valve 22a provided on its output side. Further, shuttle valves 22b are provided at multiple stages on the output side of the shuttle valves 22a (FIG. 2 illustrating only the final stage shuttle valve 22b). The final stage shuttle valve 22b outputs the maximum pilot pressure of the pilot pressures output from all the operation devices.

A relief valve 23 is provided on the delivery side of the pilot pump 17. When the speed of the engine 14 is equal to or greater than a cranking speed N4 (details thereof are described later), the relief valve 23 adjusts the delivery pressure of the pilot pump 17 to a set pressure P.

An unloading valve 24 (solenoid valve) is provided on the line connecting the delivery side of the pilot pump 17 and a tank. The unloading valve 24 is switchable between the closed position on the left side of the figure (normal position) and the open position on the right side of the figure (operational position). When the speed of the engine 14 is equal to or greater than the cranking speed N4 and the unloading valve 24 is in the closed position, the delivery pressure (set pressure) of the pilot pump 17 is fed to the operation devices and the regulator device 20. On the other hand, when the unloading valve 24 is in the open position, the load on the pilot pump 17 is reduced.

The regulator device 20 is configured to make the displacement of the hydraulic pump 16 variable with using the delivery pressure of the pilot pump 17. The regulator device 20 includes a tilting cylinder 25, a hydraulic pilot type tilt control valve 26, and a solenoid valve 27.

The tilting cylinder 25 includes a servo piston 28 for making the tilting angle of the swash plate (i.e., the displacement) of the hydraulic pump 16 variable, a hydraulic chamber 29a for accommodating one end of the servo piston 28, and a hydraulic chamber 29b for accommodating the other end of the servo piston 28. The servo piston 28 is formed such that the pressure receiving area of the other end is larger than that of one end. The hydraulic chamber 29a is connected to the delivery side of the pilot pump 17 while the hydraulic chamber 29b is connected to the cylinder port of the tilt control valve 26.

The tilt control valve 26 is a three-port, three-position type control valve having the cylinder port connected to the hydraulic chamber 29b of the tilting cylinder 25, a tank port connected to the tank, and a pump port connected to the delivery side of the pilot pump 17. The tilt control valve 26 is switchable between three switching positions: the switching position left in the figure that allows the cylinder port to communicate with the tank; the switching position middle in the figure that interrupts the communication among the cylinder port, the tank port, and the pump port; and the switching position right in the figure that allows the cylinder port to communicate with the pump port.

The tilt control valve 26 includes a spool 31 that moves relative to a sleeve 30; a spring 32 provided on one side of the spool 31; and a pressure receiver 33 provided on the other side of the spool 31. The sleeve 30 is connected via a link to the servo piston 28 of the tilting cylinder 25 and moves together with the servo piston 28.

The solenoid valve 27 is provided on the line that directs the maximum pilot pressure (control pressure) from the final stage shuttle valve 22b to the pressure receiver 33 of the tilt control valve 26. The solenoid valve 27 is switchable between the switching position right in the figure (normal position) that allows the pressure receiver 33 of the tilt control valve 26 to communicate with the output side of the final stage shuttle valve 22b and the switching position left in the figure (operational position) that allows the pressure receiver 33 of the tilt control valve 26 to communicate with the tank.

When the solenoid valve 27 is in the switching position right in the figure, the maximum pilot pressure is supplied from the final stage shuttle valve 22b to the pressure receiver 33 of the tilt control valve 26. As a result, the tilt control valve 26 and the tilting cylinder 25 control to make the tilting angle of the swash plate (i.e., the displacement) of the hydraulic pump 16 variable based on the maximum pressure.

More specifically, the position of the spool 31 is determined by the balance between the maximum pilot pressure fed to the pressure receiver 33 of the tilt control valve 26 and the biasing force of the spring 32. In this case, when the maximum pilot pressure fed to the pressure receiver 33 of the tilt control valve 26 exceeds the preceding pressure, the spool 31 moves to the right in the figure relative to the sleeve 30. As a result, the tilt control valve 26 is switched to the switching position left in the figure that allows the cylinder port to communicate with the tank port, thereby reducing the pressure inside the hydraulic chamber 29b of the tilting cylinder 25. The servo piston 28 thus moves to the left in the figure, increasing the tilting angle of the swash plate (i.e., the displacement) of the hydraulic pump 16.

The leftward movement in the figure of the servo piston 28 is accompanied by a rightward movement in the figure of the sleeve 30 of the tilt control valve 26. As a result, the tilt control valve 26 is switched to the switching position middle in the figure that interrupts the communication among the cylinder port, the tank port, and the pump port. Thus, if the maximum pilot pressure fed to the pressure receiver 33 of the tilt control valve 26 is the same as the preceding pressure, the amount of hydraulic fluid inside the hydraulic chamber 29b of the tilting cylinder 25 does not change. Accordingly, the position of the servo piston 28 is retained, which maintains the tilting angle of the swash plate (i.e., displacement) of the hydraulic pump 16.

On the other hand, when the maximum pilot pressure fed to the pressure receiver 33 of the tilt control valve 26 falls below the preceding pressure, the spool 31 moves to the left in the figure relative to the sleeve 30. As a result, the tilt control valve 26 is switched to the switching position right in the figure that allows the cylinder port to communicate with the pump port, thereby increasing the pressure inside the hydraulic chamber 29b of the tilting cylinder 25. The servo piston 28 thus moves to the right in the figure, decreasing the tilting angle of the swash plate (i.e., the displacement) of the hydraulic pump 16.

The rightward movement in the figure of the servo piston 28 is accompanied by a leftward movement in the figure of the sleeve 30 of the tilt control valve 26. As a result, the tilt control valve 26 is switched to the switching position middle in the figure that interrupts the communication among the cylinder port, the tank port, and the pump port. Thus, if the maximum pilot pressure fed to the pressure receiver 33 of the tilt control valve 26 is the same as the preceding pressure, the amount of hydraulic fluid inside the hydraulic chamber 29b of the tilting cylinder 25 does not change. Accordingly, the position of the servo piston 28 is retained, which maintains the tilting angle of the swash plate (i.e., the displacement) of the hydraulic pump 16.

When the solenoid valve 27 is in the switching position left in the figure, the pressure acting on the pressure receiver 33 of the tilt control valve 26 decreases. As a result, the tilt control valve 26 and the tilting cylinder 25 make the tilting angle of the swash plate of the hydraulic pump 16 variable to a minimum tilting angle. That is, the displacement of the hydraulic pump 16 is made variable to a minimum displacement.

Figure 3:
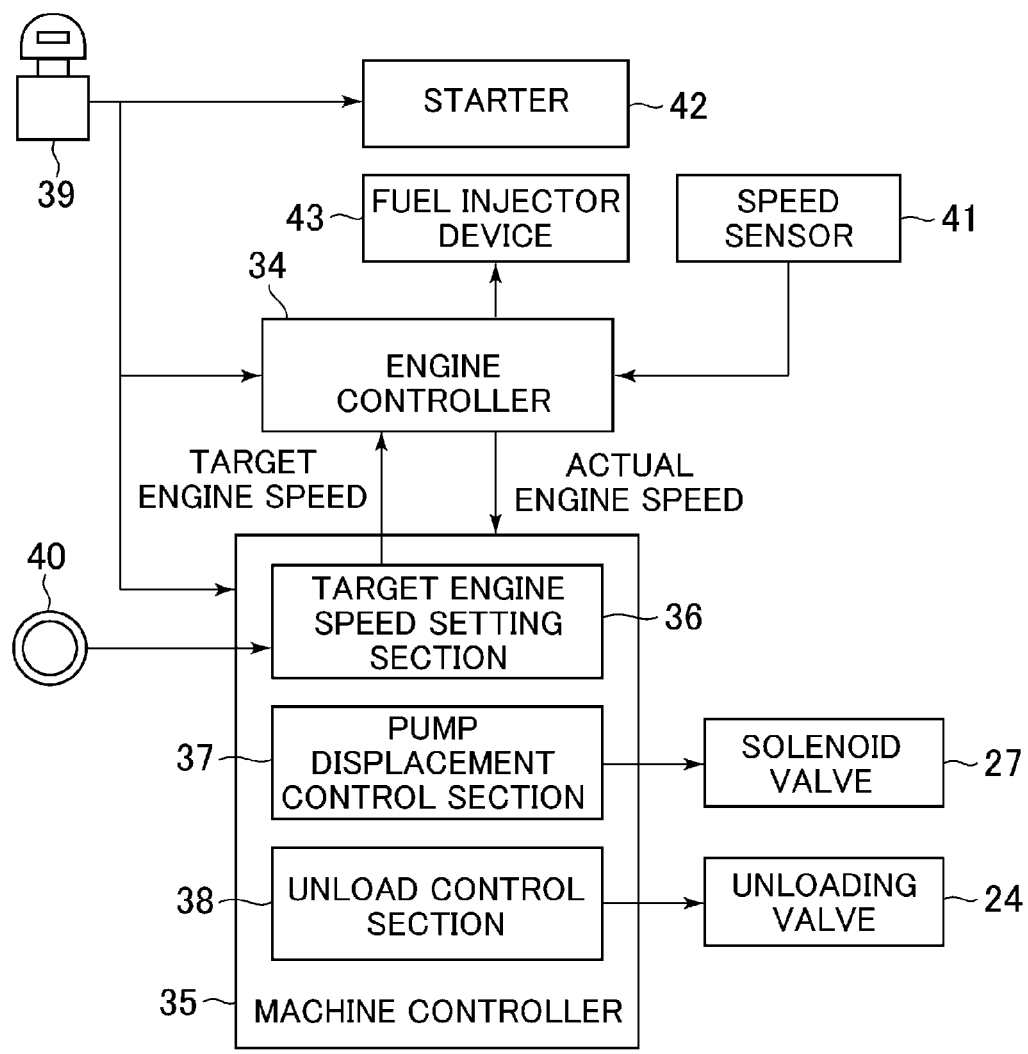
FIG. 3 is a block diagram illustrating the functional structure of the machine controller together with its associated devices according to the embodiment of the invention.
Figure 4:
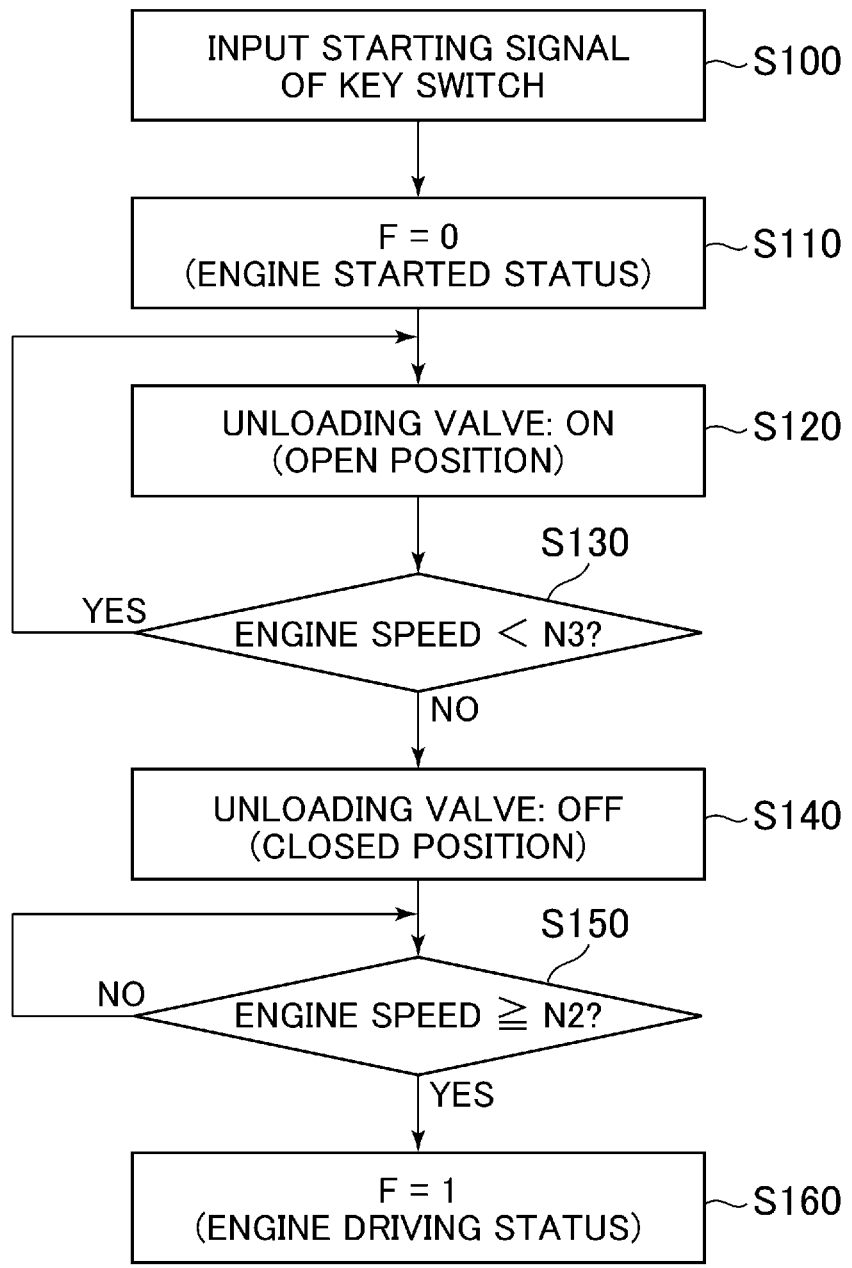
FIG. 4 is a flowchart illustrating the control processing performed by the machine controller according to the embodiment of the invention at the time of engine start-up.
Figure 5:
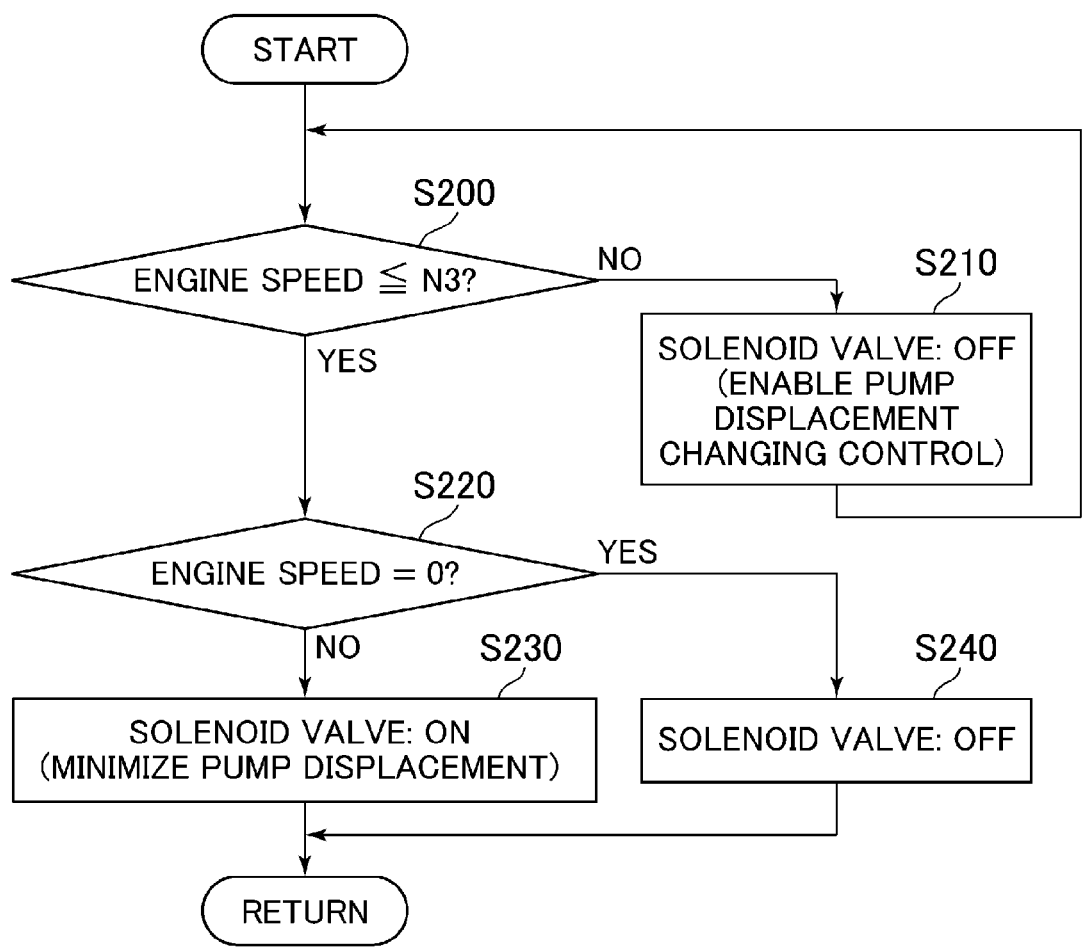
FIG. 5 is a flowchart illustrating the control processing performed by the machine controller according to the embodiment of the invention while an engine is being driven.

Next described is a control system of the hydraulic excavator of the present embodiment. FIG. 3 is a block diagram illustrating an engine controller and the machine controller according to the present embodiment together with their associated devices. FIG. 4 is a flowchart illustrating the control processing performed by the machine controller of the present embodiment at the time of engine start-up. FIG. 5 is a flowchart illustrating the control processing performed by the machine controller of the present embodiment while the engine is being driven.

The control system includes an engine controller 34 and a machine controller 35. The machine controller 35 includes, as the functional structures, a target speed setting section 36 configured to set a target speed for the engine 14, a pump displacement control section 37 configured to control the displacement of the hydraulic pump 16 by controlling the solenoid valve 27 of the regulator device 20, and an unload control section 38 for controlling the unloading valve 24. The controllers 34 and 35 each include a computational control unit (e.g., CPU) for executing computation processing or control processing based on programs and a storage unit (e.g., ROM and RAM) for storing such programs and the results of the computation processing.

A key switch 39 and a dial 40 are provided in the above-described cab 12. The dial 40 selects a speed for the engine 14 from the speed range (e.g., the range of 2,000 to 800 rpm) in which delivery pressures capable of driving the hydraulic actuators can be obtained for the hydraulic pump 16.

The target speed setting section 36 of the machine controller 35 sets a target speed N1 for the engine 14 based on the speed selected with the dial 40 and outputs the set target speed N1 to the engine controller 34. A speed sensor 41 is attached to the engine 14 (see FIG. 2 described above). The speed sensor 41 detects the actual speed of the engine 14 and outputs it to the engine controller 34 and the machine controller 35.

A minimally required engine speed (e.g., 800 rpm) at which a delivery pressure capable of driving a hydraulic actuator can be obtained for the hydraulic pump 16 is hereinafter referred to as an idle speed N2. Also, a minimally required engine speed (e.g., 200 rpm) at which a delivery pressure capable of driving the regulator device 20 can be obtained for the pilot pump 17 is referred to as a cranking speed N4. The machine controller 35 stores the idle speed N2 and a low speed N3 (e.g., 400 rpm) that is a preset value smaller than the idle speed N2 and larger than the cranking speed N4.

The key switch 39 can be operated either in an OFF position, an ON position, or a START position. When the key switch 39 is operated from the OFF position to the ON position, the engine controller 34 and the machine controller 35 are powered ON.

When the key switch 39 is operated from the ON position to the START position, a starter 42 is driven to start the engine 14. At this time, the key switch 39 outputs a starting signal to the engine controller 34 and the machine controller 35. Here, the key switch 39 is configured to automatically move from the START position back to the ON position.

When the engine controller 34 receives the starting signal from the key switch 39, the engine controller 34 controls a fuel injector device 43 of the engine 14 such that the speed of the engine 14 is increased. Thereafter, the engine controller 34 controls the fuel injector device 43 of the engine 14 such that the actual speed of the engine 14 detected by the speed sensor 41 becomes equal to the target speed.

As illustrated in FIG. 4, when the machine controller 35 receives the starting signal from the key switch 39 (step S100), the unload control section 38 of the machine controller 35 initializes the engine flag F to 0 (engine started status) (step S110). The unload control section 38 then outputs a drive signal to the solenoid part of the unloading valve 24 to control the unloading valve 24 to the open position (step S120). The unload control section 38 also determines whether or not the actual speed of the engine 14 detected by the speed sensor 41 is less than the low speed N3 (step S130). The unloading valve 24 is controlled to the open position as long as the actual speed of the engine 14 is less than the low speed N3 (step S120).

Thereafter, when the actual speed of the engine 14 detected by the speed sensor 41 exceeds the low speed N3, the unload control section 38 controls the unloading valve 24 to the closed position without outputting any drive signal to the solenoid part of the unloading valve 24 (step S140). The unload control section 38 then determines whether or not the actual speed of the engine 14 detected by the speed sensor 41 has reached the idle speed N2 (step S150). If the actual speed of the engine 14 has reached the idle speed N2, the engine flag F is overwritten by 1 (engine driving status) (step S160).

The pump displacement control section 37 of the machine controller 35 performs the control processing of FIG. 5 periodically while the engine 14 is being driven (that is, while the engine flag F=1). Specifically, the pump displacement control section 37 first determines whether or not the actual speed of the engine 14 detected by the speed sensor 41 is equal to or less than the low speed N3 (step S200). If the actual speed of the engine 14 exceeds the low speed N3, the pump displacement control section 37 controls the solenoid valve 27 to the switching position that allows the pressure receiver 33 of the tilt control valve 26 to communicate with the output side of the final stage shuttle valve 22b, without outputting any drive signal to the solenoid part of the solenoid valve 27 of the regulator device 20 (step S210). This activates the control (positive control) of making the displacement of the hydraulic pump 16 variable based on the maximum operation pilot pressure.

On the other hand, when the actual speed of the engine 14 decreases due to overload or the like, and the actual speed of the engine 14 becomes equal to or less than the low speed N3, the pump displacement control section 37 further determines whether or not the actual speed of the engine 14 detected by the speed sensor 41 is zero (step S220). Because the actual speed of the engine 14 is not zero at first, the pump displacement control section 37 outputs a drive signal to the solenoid part of the solenoid valve 27 of the regulator device 20 to control the solenoid valve 27 to the switching position that allows the pressure receiver 33 of the tilt control valve 26 to communicate with the tank (step S230). With this, the displacement of the hydraulic pump 16 is made variable to a minimum displacement. Thereafter, if the actual speed of the engine 14 becomes zero, the pump displacement control section 37 stops outputting the drive signal to the solenoid part of the solenoid valve 27 (step S240).

Figure 6:
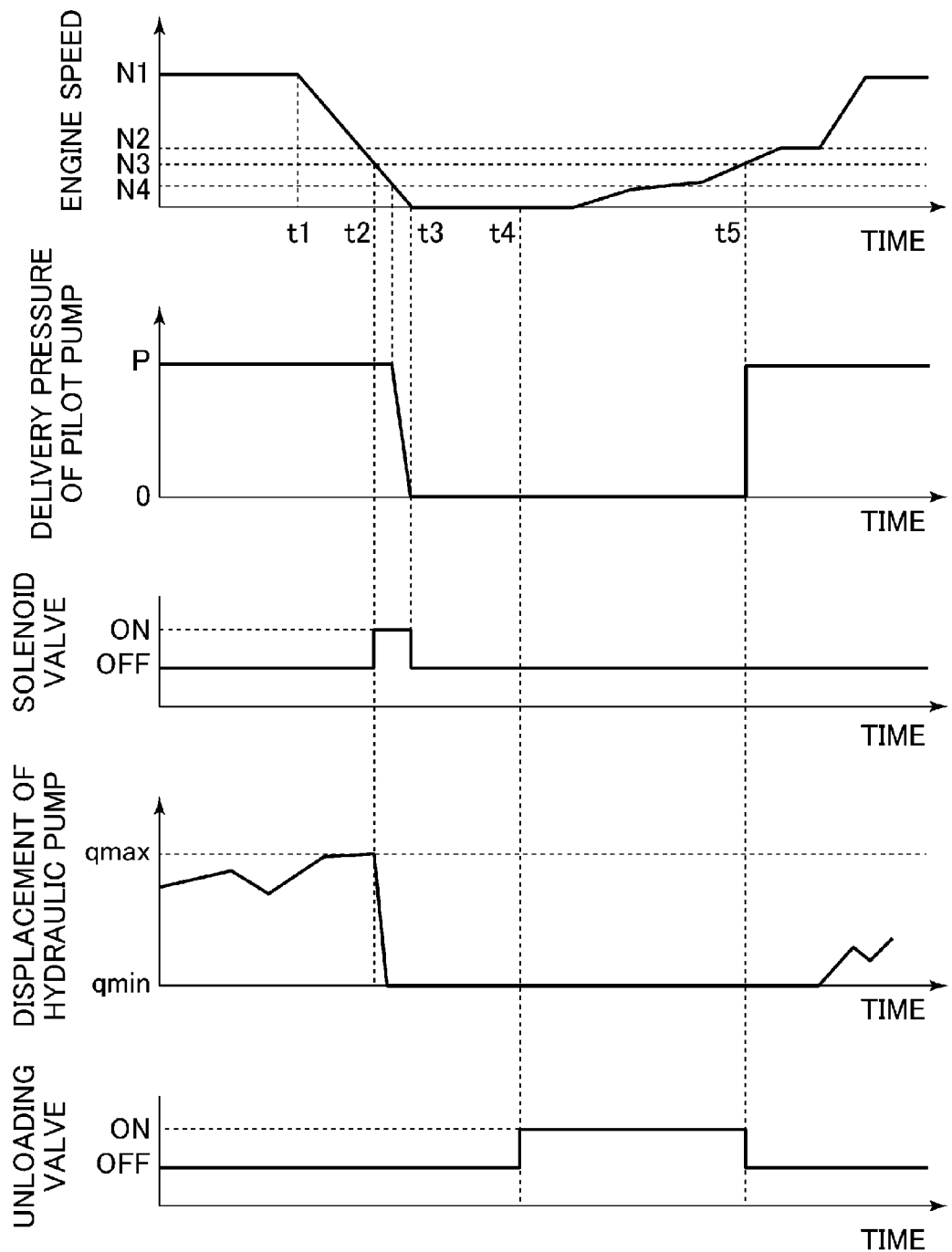
FIG. 6 is a time chart for illustrating the operation in the embodiment of the invention.

Next described is the operation and advantageous effects of the present embodiment. FIG. 6 is a time chart for illustrating how the present embodiment works; specifically, it illustrates temporal changes in the actual speed of the engine 14, the delivery pressure of the pilot pump 17, and the displacement of the hydraulic pump 16 together with the operation of the solenoid valve 27 of the regulator device 20 and the unloading valve 24.

As illustrated in FIG. 6, when the engine 14 undergoes overload while being driven (time t1), the speed of the engine 14 decreases. While the actual speed of the engine 14 decreases from the low speed N3 to zero (from time t2 to time t3), the pump displacement control section 37 of the machine controller 35 drives the solenoid valve 27 of the regulator device 20 to allow the pressure receiver 33 of the tilt control valve 26 to communicate with the tank. With this, the displacement of the hydraulic pump 16 is made variable to a minimum displacement qmin. Thus, even when the engine 14 stops against the will of the operator, the displacement of the hydraulic pump 16 can be made variable to the minimum displacement qmin. Therefore, the displacement of the hydraulic pump 16 will not reach, for example, a maximum displacement qmax at the time of start-up of the engine 14, thereby reducing the load on the hydraulic pump 16.

Also, until the actual speed of the engine 14 reaches the low speed N3 after the operator operating the key switch 39 to the START position (from time t4 to time t5), the unload control section 38 of the machine controller 35 drives the unloading valve 24 to allow the delivery side of the pilot pump 17 to communicate with the tank. This reduces the load on the pilot pump 17. At this time, the regulator device 20 need not be driven; thus, no problem will arise even if a sufficient delivery pressure cannot be obtained from the pilot pump 17.

Therefore, according to the present embodiment, the load torque at the time of start-up of the engine 14 can be reduced even when the engine 14 stops again the will of the operator.

In the above embodiment, described is a case where the pump displacement control section 37 of the machine controller 35 drives the solenoid valve 27 of the regulator device 20 while the actual speed of the engine 14 detected by the speed sensor 41 decreases from the low speed N3 to zero. However, the invention is not limited to the above case, and various modifications can be made without departing from the scope or spirits of the invention. For example, it is also possible to preset a speed (e.g., 100 rpm) that is smaller than the cranking speed N4 and larger than zero and to drive the solenoid valve 27 of the regulator device 20 while the actual speed of the engine 14 detected by the speed sensor 41 changes from the low speed N3 to the set speed. This leads to the same advantageous effects as the above.

Also, in the above embodiment, described is a case where the unload control section 38 of the machine controller 35 controls the unloading valve 24 to the open position when the speed of the engine 14 detected by the speed sensor 41 is less than the low speed N3 at the time of start-up of the engine 14 and switches the unloading valve 24 to the closed position when the speed of the engine 14 detected by the speed sensor 41 becomes equal to or greater than the low speed N3. However, the invention is not limited to the above case, and various modifications can be made without departing from the scope or spirits of the invention.

The unload control section 38 of the machine controller 35 may control the unloading valve 24 to the open position when the speed of the engine 14 detected by the speed sensor 41 is less than the idle speed N2 at the time of start-up of the engine 14, and the unload control section 38 may switch the unloading valve 24 to the closed position when the speed of the engine 14 detected by the speed sensor 41 becomes equal to or greater than the idle speed N2. This also leads to the same advantageous effects as the above.

Alternatively, the unload control section 38 of the machine controller 35 may control the unloading valve 24 in the open position until a preset predetermined time (specifically, a time necessary for the speed of the engine 14 to increase up to the low speed N3 or the idle speed N2) passes after the output of a starting signal from the key switch 39 at the time of start-up of the engine 14. The unload control section 38 may switch the unloading valve 24 to the closed position after passage of the predetermined time. This also leads to the same advantageous effects as the above.

Moreover, in the above embodiment, described is a case where the pump displacement control section 37 performs the control (positive control) of making the displacement of the hydraulic pump 16 variable based on the maximum operation pilot pressure by directing the maximum operation pilot pressure to the pressure receiver 33 of the tilt control valve 26 of the regulator device 20. However, the invention is not limited to the above case, and various modifications can be made without departing from the scope or spirits of the invention. For example, it is also possible to provide a throttle at the furthest downstream section of the center bypass line passing multiple directional control valves and direct the upstream-side pressure (control pressure) of the throttle to the pressure receiver 33 of the tilt control valve 26 of the regulator device 20, thereby performing the control (negative control) of making the displacement of the hydraulic pump 16 variable based on the upstream-side pressure of the throttle. This also leads to the same advantageous effects as the above.

Further, in the above embodiment, described is a case where the regulator device 20 includes the tilting cylinder 25, the hydraulic pilot type tilt control valve 26, and the solenoid valve 27. However, the invention is not limited to the above case, and various modifications can be made without departing from the scope or spirits of the invention. In terms of the problems the invention is to solve, the regulator device 20 can be any regulator as long as it can make the displacement of the hydraulic pump 16 variable with using the delivery pressure of the pilot pump 17. For instance, the regulator device 20 can be structured by a tilting cylinder and a solenoid tilt control valve. This also leads to the same advantageous effects as the above.

Furthermore, in the above description, explained is a case where the invention is applied to hydraulic excavators, but the invention can also clearly be applied to other construction machines such as cranes and wheel loaders.

DESCRIPTION OF REFERENCE CHARACTERS

5: Travel motor
9: Boom cylinder
10: Arm cylinder
11: Bucket cylinder
14: Engine
15: Right work-related operating member
16: Hydraulic pump
17: Pilot pump
18: Boom directional control valve
20: Regulator device
24: Unloading valve
25: Tilting cylinder
26: Tilt control valve
27: Solenoid valve
35: Machine controller
37: Pump displacement control section
38: Unload control section
39: Key switch
41: Speed sensor

The invention claimed is:

1. A construction machine comprising:
an engine;
a speed sensor for detecting a speed of the engine;
a hydraulic pump of a variable displacement type driven by the engine;
a hydraulic actuator;
a directional control valve for controlling a flow of hydraulic fluid from the hydraulic pump to the hydraulic actuator based on an operation of an operating member;
a pilot pump of a fixed displacement type driven by the engine;
a regulator device configured to make a displacement of the hydraulic pump variable with using a delivery pressure of the pilot pump;

an unloading valve provided on a line connecting a delivery side of the pilot pump to a tank, the unloading valve being switchable between an open position and a closed position; and a control device including a pump displacement control section configured to control the displacement of the hydraulic pump by controlling the regulator device and an unload control section configured to control the unloading valve to the open position at a time of start-up of the engine, wherein the pump displacement control section is configured to:

store a low speed preset for the engine, the low speed being smaller than a minimally required idle speed of the engine necessary to obtain a delivery pressure of the hydraulic pump capable of driving the hydraulic actuator and larger than a minimally required cranking speed of the engine necessary to obtain a delivery pressure of the pilot pump capable of driving the regulator device; and make the displacement of the hydraulic pump variable to a minimum displacement by controlling the regulator device when the speed of the engine detected by the speed sensor becomes equal to or less than the low speed while the engine is being driven.

2. The construction machine of claim 1, wherein the regulator device includes:

a tilting cylinder for making a tilting angle of a swash plate of the hydraulic pump variable;

a hydraulic pilot type tilt control valve being switchable between a switching position that allows a hydraulic chamber of the tilting cylinder to communicate with the delivery side of the pilot pump and a switching position that allows the hydraulic chamber of the tilting cylinder to communicate with the tank; and a solenoid valve provided on a line that directs control pressure to a pressure receiver of the tilt control valve, and wherein the pump displacement control section is configured to control the solenoid valve to make the displacement of the hydraulic pump variable to be the minimum displacement when the speed of the engine detected by the speed sensor becomes equal to or less than the low speed while the engine is being driven.

3. The construction machine of claim 1, wherein the unload control section is configured to control the unloading valve to the open position when the speed of the engine detected by the speed sensor is less than the low speed or the idle speed at the time of start-up of the engine, and switches the unloading valve to the closed position when the speed of the engine detected by the speed sensor becomes equal to or greater than the low speed or the idle speed.

4. The construction machine of claim 1, wherein the unload control section is configured to control the unloading valve to the open position until a preset predetermined time passes after an input of a starting signal from a key switch at the time of start-up of the engine, and switches the unloading valve to the closed position after passage of the predetermined time.

* * * * *